J. WILLIAMSON.
PNEUMATIC SUSPENSION DEVICE FOR VEHICLES.
APPLICATION FILED MAR. 31, 1911.
1,016,810.
Patented Feb. 6, 1912.
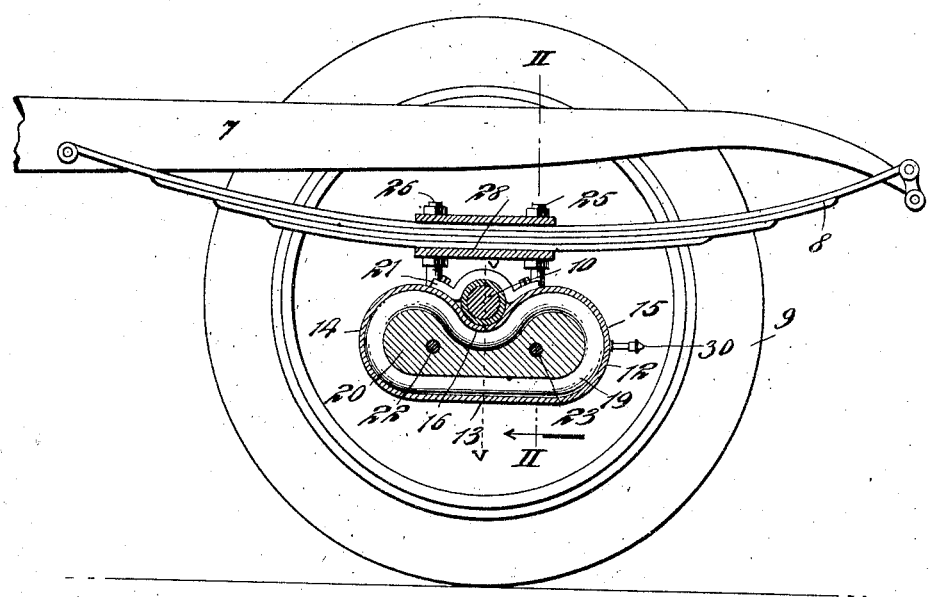
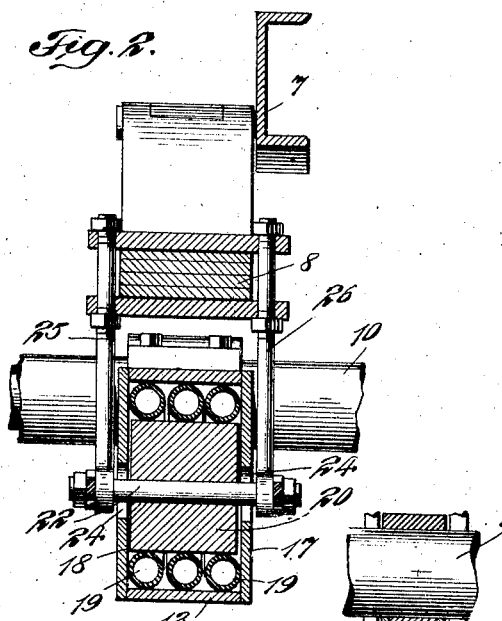
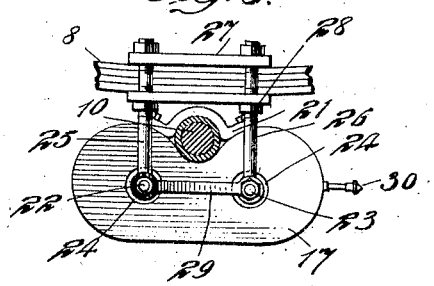
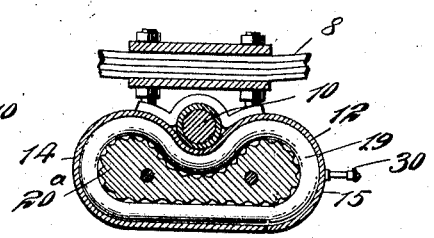
INVENTOR
John Williamson
BY
Criswell & Criswell
ATTORNEYS

UNITED STATES PATENT OFFICE.

JOHN WILLIAMSON, OF BROOKLYN, NEW YORK, ASSIGNOR, BY DIRECT AND MESNE ASSIGNMENTS, OF ONE-THIRD TO HARVEY E. RANDALL AND ONE-THIRD TO ALBERT P. STEWART, BOTH OF BROOKLYN, NEW YORK.

PNEUMATIC SUSPENSION DEVICE FOR VEHICLES.

1,016,810.      Specification of Letters Patent.      Patented Feb. 6, 1912.

Application filed March 31, 1911. Serial No. 618,181.

*To all whom it may concern:*

Be it known that I, JOHN WILLIAMSON, a citizen of the United States, and a resident of Brooklyn, county of Kings, and State of New York, have invented certain new and useful Improvements in Pneumatic Suspension Devices for Vehicles, of which the following is a full, clear, and exact description.

The principal object of this invention is to provide an improved means for utilizing a pneumatic cushion device as a spring or auxiliary spring between a frame member of a vehicle, and the axle.

A further object of the invention is to provide means for engaging a pneumatic annular member or ring, on the inner and outer sides by two members respectively, such two members being connected to the axle and to the spring or other frame member, in which arrangement a resilient action is obtained operating universally in a vertical plane, and in which construction when the two members coöperating with the pneumatic ring move either up or down a very large portion of the ring is compressed by their movement, at the same time a fore-and-aft movement of the two ring engaging members will engage and compress a comparatively large portion of the resilient ring.

With the foregoing and other objects in view, the invention will be hereinafter more particularly described with reference to the accompanying drawings, which form a part of this specification, and will then be pointed out in the claims at the end of the description.

In the accompanying drawing showing embodiments of my invention, Figure 1 shows conventionally the rear portion of a vehicle, with my invention applied thereto and shown in vertical section. Fig. 2 is a vertical enlarged section on the line of II—II of Fig. 1. Fig. 3 is a side elevation of the device as shown in Fig. 1. Fig. 4 is a section of the device as shown in Fig. 1 with a different form of inner member. Fig. 5 is a vertical section enlarged on the line V—V of Fig. 1.

While this invention is especially designed for use in motor cars or vehicles, it can be used with any kind of a vehicle employing a body and a wheel and axle. In Fig. 1 is shown the rear portion 7 of the frame member of a motor vehicle, with a semi-elliptical spring 8, and a wheel 9, carried by the axle 10, that may be of any desired form or construction, and is shown as solid.

One of the purposes of this invention is to use a pneumatic ring in an upright position, and with its opposed members connected to the spring and axle respectively yet requiring the separation between the spring and axle of a very short distance such as a few inches. As shown in the drawings this is accomplished by distorting the ring from extending in a circle, by making it somewhat elliptical with the major axis horizontal, and at the same time forming a kind of reëntrant portion at one of the horizontal sides that are shown as disposed at the top.

As illustrated, there is provided a casing having a peripheral wall 12 that is somewhat elliptical in general outline, but has the lower wall 13 extending substantially in a horizontal plane. The end portions 14 and 15, formed in the shape of a semi-circle, and the top instead of being horizontal like the bottom has a reëntrant portion 16 in the form of an ogee curve. This casing may be provided with side plates 17 and 18 corresponding in shape to its outline and secured thereto in any suitable manner, one of them being readily removable for access to the interior.

The resilient member is shown in the form of an endless tubular ring 19, such as the single tube pneumatic tires at present in use on various forms of vehicles. The size or circumference of this ring is such that it will fit in the casing and engage the inner face of the peripheral wall 15. The ring 19 incloses a floating member in the form of a block 20, shown as solid, but which obviously may be a chamber or hollow member. The periphery of this block and its dimensions are such that it is inclosed by the ring 19 when placed in the casing and engages the same throughout its perimeter. Thus it will be seen that the ring or tube when inflated will engage the casing and the block by its opposite portions. This block is not secured to the side walls 17 and 18 of the casing, but is free therefrom and practically floats inside of the ring and is free to have a universal movement in a vertical plane, to compress the pneumatic ring, when it is moved in any direction whatever in a vertical plane from its normal position. These two engaging members for the inside and outside of the resilient ring 19, that are relatively free to move in the plane of the ring, are connected with the two members of the vehicle that are usually directly secured together, that is, the axle and the spring or other member of the frame. As shown the floating member or block 20 is secured to the spring, and the axle is directly secured to the casing 12.

The axle is shown secured to the casing at the reëntrant portion 16, by a clamp plate 21 placed around the axle. Suitable means are provided for rigidly connecting the floating block 20 with the frame member such as the spring 8. Bolts 22, 23 extend out from the block on each side passing through openings 24 in the side walls 17 and 18 of the casing, that are large enough to allow free movement of the bolts without engaging margins of the opening. A yoke member is shown connecting the spring with these bolts, in the form of clamp bolts 25 and 26 on each side, secured to said bolts, and connected with the spring by means of clamp plates 27 and 28. A cross-bar 29 is placed on the bolts with the lugs, to take the strain off of the latter. It will be seen that these yokes are off-set from the casing member so as to have a free movement by the floating of the block in the casing, and it will be also seen that the spring with the yoke and block are entirely free from the axle and its connection with the casing at the top, the axle passing through the yoke and having a considerable free movement in all directions in a vertical plane, without striking either of the yoke members of the spring. By these means the axle is rigidly secured to the casing member, while the spring is rigidly connected with the block 20, and the latter has a free and universal movement in a vertical plane inside of the casing, that is limited only by the compression of the resilient tube 19 interposed between the block and the wall of the casing. Of course it is understood that one of these devices is provided on each side of the car for each spring and connected with each end portion of the axle. The tube 19 is shown as having a valve stem 30 that projects out through an opening in the casing, for inflation of the tube. In Fig. 2 the same construction is illustrated, but the block and casing are simply made much wider to accommodate a plurality of the resilient tubes 19 that are placed side by side, and the construction and operation of such devices is perfectly obvious. This is desirable for commercial vehicles or cars of heavy weight, where a single tube might not be sufficient to withstand the strain.

In Fig. 4 the block 20ª is shown as having transversely extending projections or corrugations on its perimeter to engage the tube at a number of separated places.

It will thus be seen that the device can be applied to any sort of a vehicle by having its two parts secured to the axle and to the engaging member of the vehicle such as the spring, by simply disconnecting such members; and will result in merely elevating the spring and body a very short distance such as a few inches, which need be only sufficient to allow a vertical movement equal to the maximum movement of the block or floating member inside of the casing.

It will also be understood from the arrangement or shape of the casing and block, that the normal load or strain will be between the block and the lower portion of the casing, for the reason that the casing being secured to the axle corresponds to the supporting member and the body being connected with the block, serves to force the latter downward against the lower portion of the casing. This will serve to compress the pneumatic ring along the lower horizontal portion 13 of the casing and the block. But when during the running of the vehicle there is a rebound or recoil following a large depression of the spring 8, the block 20 will be carried upward, and tend to raise the axle and wheels with connected parts, such as the driving shaft. This will result in compressing such portion of the ring 19 as lies between the upper portion of the block and the opposite portion of the casing, and will engage the tube along a portion extending in a double curve in the similar horizontal direction and which is longer than the comparatively straight lower portion 13. This will give the action of a shock absorber and tend to neutralize and absorb the rebound and thereby take the place of all such devices as are almost necessary on vehicles of any considerable weight. But the device also acts as a cushion to absorb shocks in a fore-and-aft direction. When the wheel strikes a stone or obstruction, it tends to stop, that will put a strain on the casing in the rearward direction, and the floating block carried by the spring will move forward partaking of the momentum of the car. This will result in the compression of the ring at the front semi-circular portion thereof, that will again act as a shock absorber. But this forward movement of the block relative to the casing, will also compress the ring 19 at the rear portion of the reëntrant curved part 16 and increase the amount of the resilient tube that is compressed by such an operation. On the other hand, when the wheel moves into a depression in the road, the wheel will tend to move forward faster than the body, and the frame 12 will move forward relative to the block 20. This will have the effect of compressing the tube at the rear semi-circular portion of the casing; and will have the further effect of compressing the tube at the forward half portion of the reëntrant curved part 16, which will have a very large and efficient resilient operation.

Having thus described my invention, I claim as new and desire to secure by Letters Patent—

1. In a vehicle, the combination with the axle and frame member, of a casing, an annular resilient member vertically arranged in the casing and engaging the peripheral wall of the casing, a block in the casing engaging the resilient member by its periphery and freely movable in the casing in all directions to compress the resilient member when moved in any direction in said casing, the casing and block having similar peripheral reëntrant portions, the axle and the frame member being connected with the block and the casing, by the block being secured to one of said two members and the casing at its reëntrant portion being secured to the other of said two members.

2. In a vehicle, the combination with a frame member and the axle, of a casing having a reëntrant portion and a horizontal portion, a block of a similar shape located in the casing, a resilient member interposed between the periphery of the block and the wall of the casing, bolts projecting out from the block on each side, a yoke member extending upwardly from said bolts on each side, said two members the yoke and the reëntrant portion of the casing being one of them secured to the axle and the other one to the frame member of the vehicle.

3. A suspension device comprising a casing provided with an axle seat, means for fastening said casing to said axle, below the same, a block corresponding in contour with said casing and freely movable therein, resilient means surrounding said block, and yokes for suspending said block from a vehicle frame.

4. A suspension device comprising a casing provided with a transversely arranged axle seat in its top, means for clamping an axle to said seat, said casing being provided with alined side openings, a block freely movable in said casing and provided with laterally projecting bolts that extend through said openings, frame engaging yokes carried by said bolts, and compressible means interposed between said block and casing.

5. A suspension device comprising a casing, means for suspending the same from a vehicle axle below said axle, an inflatable cushion in said casing, a block surrounded by said cushion and having roughened surfaces for gripping said cushion, and yokes for suspending said block from a vehicle frame.

6. In a vehicle, the combination with a frame member and an axle, of a casing having a reëntrant portion and a horizontal portion, a block located in the casing, a resilient member interposed between the periphery of the block and the wall of the casing, bolts projecting out from the block on each side, a yoke member extending upwardly from said bolts on each side, said two members the yoke and the casing being one of them secured to the axle and the other one to the frame member of the vehicle.

7. A cushioning device comprising a casing having a reëntrant portion, cushioning means located within the casing and also having a reëntrant portion and an elongated floating member having surfaces of relatively different extents engaging with said cushioning means and on opposite sides thereof.

This specification signed and witnessed this 30th day of March A. D. 1911.

JOHN WILLIAMSON.

Witnesses:
W. A. TOWNER, Jr.,
L. I. MAYER.